Nov. 29, 1955     E. R. MUDDIMAN     2,725,137
DOWNTILTING AND TRANSFER DEVICE
Filed Dec. 15, 1952     3 Sheets-Sheet 1
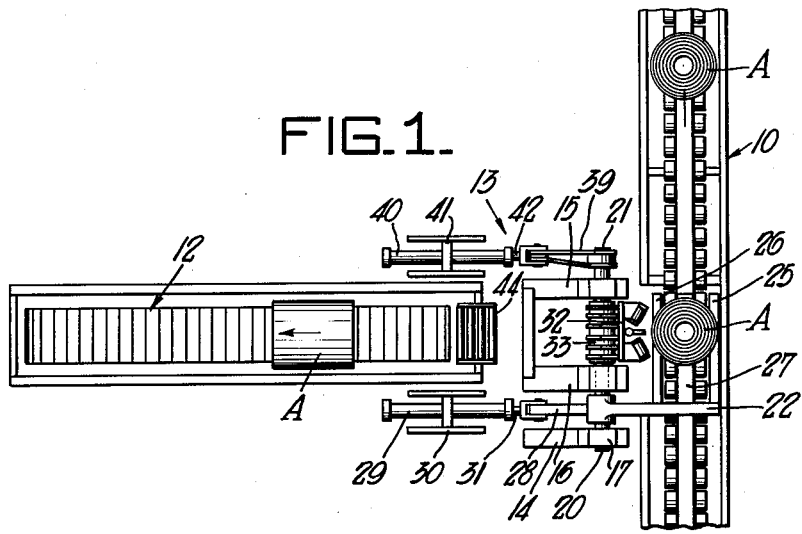
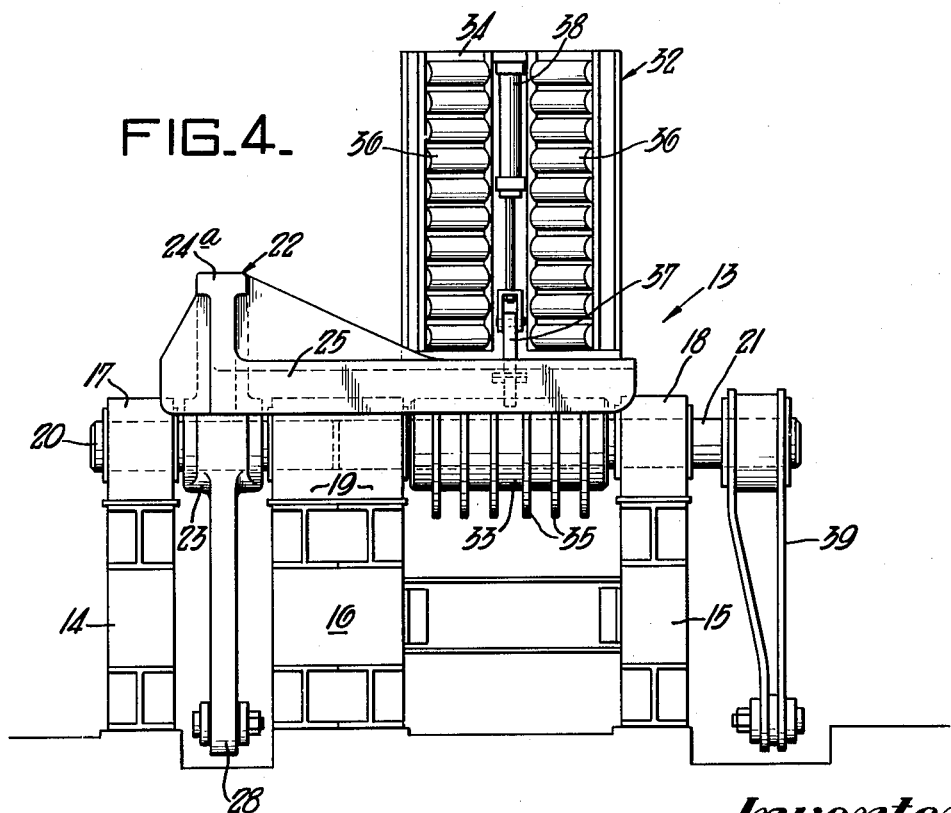
Inventor:
EARLL R. MUDDIMAN,
by: Donald G. Dalton
his Attorney.

Nov. 29, 1955   E. R. MUDDIMAN   2,725,137
DOWNTILTING AND TRANSFER DEVICE
Filed Dec. 15, 1952   3 Sheets-Sheet 2
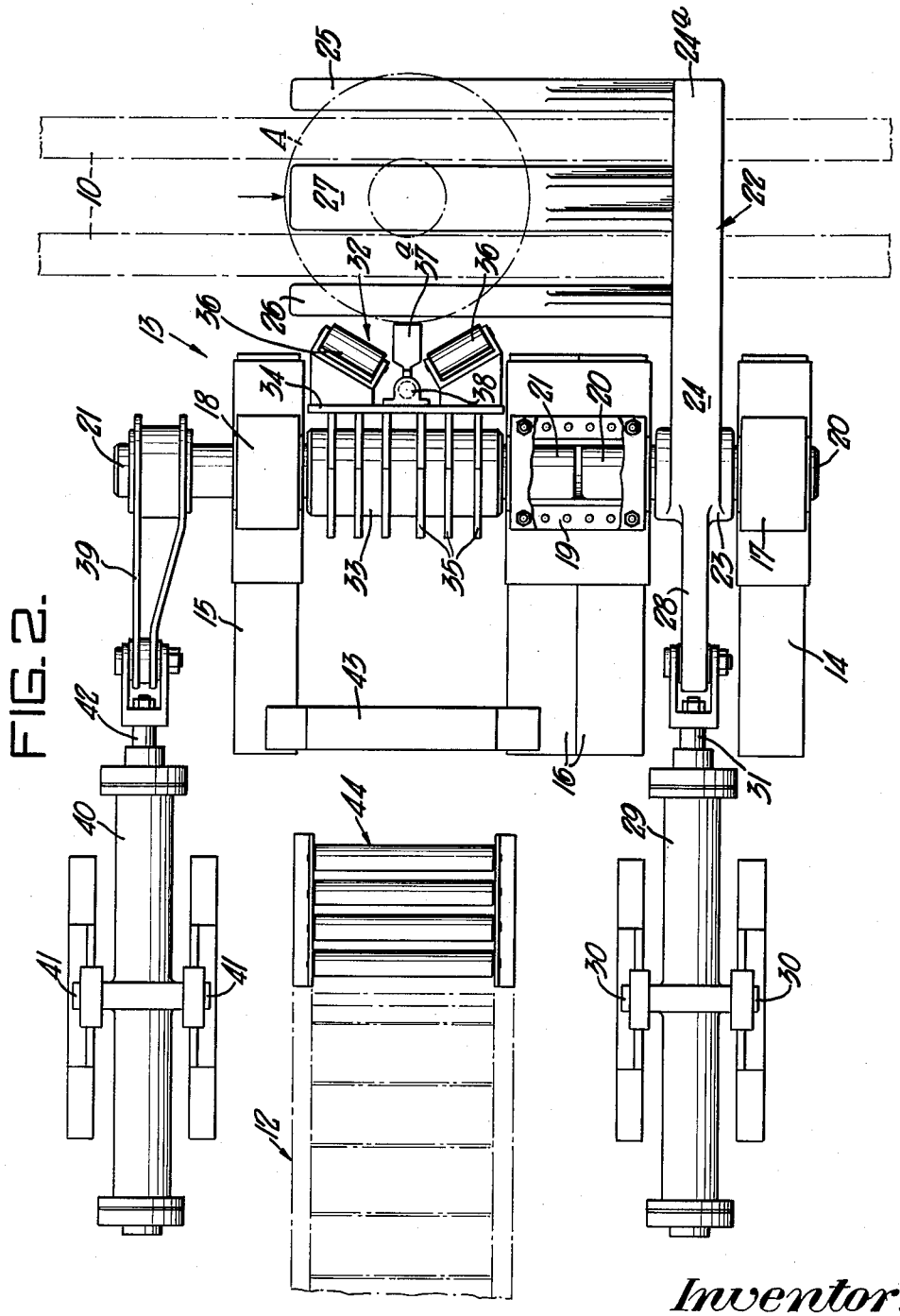
Inventor:
EARLL R. MUDDIMAN,
by: Donald G. Dalton
his Attorney.

Nov. 29, 1955  E. R. MUDDIMAN  2,725,137
DOWNTILTING AND TRANSFER DEVICE
Filed Dec. 15, 1952  3 Sheets-Sheet 3

Inventor:
EARLL R. MUDDIMAN,
by: Donald G. Dalton
his Attorney.

United States Patent Office 2,725,137
Patented Nov. 29, 1955

2,725,137

DOWNTILTING AND TRANSFER DEVICE

Earll R. Muddiman, Wilkinsburg, Pa., assignor to United States Steel Corporation, a corporation of New Jersey Application December 15, 1952, Serial No. 325,986

3 Claims. (Cl. 198—33)

This invention relates to an improved device for downtilting heavy articles and transferring them from one conveyor to another.

One example of a handling operation for which the device is particularly suited is that of transferring coils of hot rolled metal strip from a conveyor which leads from a hot strip mill to a second conveyor which leads to a storage area. Nevertheless it is apparent that the device has general utility for handling articles in this fashion, and the invention is not limited to any specific environment nor to handling any specific articles. In the example the coils commonly rest on their ends on the first conveyor and on their sides on the second conveyor. The usual device for transferring them between conveyors comprises a pivotally mounted frame of L-shape in side elevation. The frame has a load receiving position, in which one leg of the L occupies approximately the plane of the first conveyor, and a load delivering position 90° removed in which the other leg occupies approximately the plane of the second conveyor. As the frame transfers a load, the entire frame must pivot a full 90° and return before it can receive the next load. Consequently the transfer operation is slow and unduly limits the capacity of the conveyors. Previous devices with which I am familiar commonly require approximately a full minute after they have received a coil for transfer before they are reset to receive the next coil.

An object of the present invention is to provide an improved downtilting and transfer device which permits much faster conveyor operation than previous devices with which I am familiar.

A further object is to provide an improved downtilting and transfer device which has independently operated receiving and delivery means, whereby the former can return to its load receiving position before the full operating cycle is completed.

A more specific object is to provide an improved downtilting and transfer device which includes a pivotally supported carrier adapted to receive loads from a conveyor, a separate and independently pivotally supported carrier adapted to take loads from the first carrier and deliver them to a second conveyor, and separate operating means for each carrier, whereby the first carrier can return to its load receiving position as soon as the second carrier takes the load without completing a full operating cycle.

In accomplishing these and other objects of the invention, I have provided improved details of structure, a preferred form of which is shown in the accompanying drawings, in which:

Figure 1 is a top plan view of a pair of conveyors and a downtilting and transfer device which embodies features of the present invention;

Figure 2 is a top plan view on a larger scale of the downtilting and transfer device;

Figure 4 is an end elevational view of the device.

Figure 3:
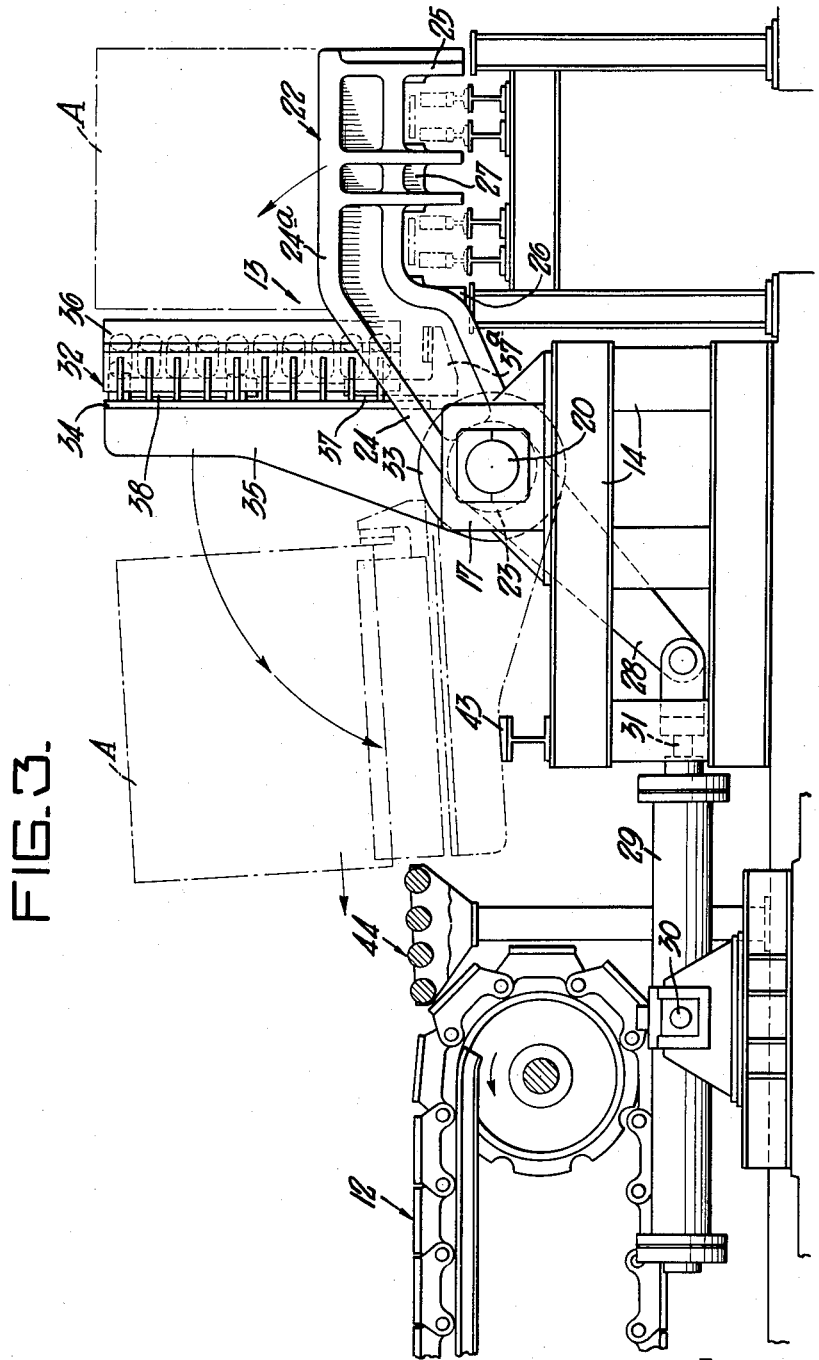
Figure 3 is a side elevational view of the device.

Figure 1 shows first and second conveyors 10 and 12 adapted to transport heavy articles A, such as coils of steel strip. In this instance the conveyors are disposed at right angles to each other. A downtilting and transfer device 13 constructed in accordance with the present invention is situated between the conveyors for transferring articles A from conveyor 10 to conveyor 12, but tilted 90° from their original position. In the example of coils of strip metal, the coils rest on their ends on conveyor 10 and on their sides on conveyor 12.

The device 13 comprises outer supporting frames 14 and 15 and an intermediate supporting frame 16, which is spaced somewhat farther from the outer frame 15 than from the outer frame 14 (Figures 2 and 4). The three supporting frames 14, 15 and 16 carry axially aligned bearings 17, 18 and 19 respectively at their upper ends. Preferably the central bearing 19 is approximately twice the length of each of the outer bearings 17 and 18. The outer bearing 17 and central bearing 19 rotatably support a horizontal shaft 20, while the other outer bearing 18 and central bearing 19 rotatably support a second horizontal shaft 21. The two shafts are axially aligned, but are independently rotatable.

An article receiving carrier 22 is fixed to the shaft 20 to turn therewith. The carrier 22 includes a hub 23 keyed to the shaft, an arm formed of inner and outer portions 24 and 24a extending from said hub, and a plurality of L-shaped fingers 25, 26 and 27 depending from the outer portion of the arm (Figure 3). The inner portion 24 of the arm extends radially from the hub. When the carrier is in its load receiving position, the outer portion 24a of the arm extends horizontally and the fingers 25 and 26 are located at opposite sides of the strands of conveyor 10 and the finger 27 between these strands. An operating lever 28 also is fixed to the hub 23 and extends radially therefrom opposite the arm portion 24. Conveniently the hub 23, the arm portions 24 and 24a, the fingers 25, 26 and 27 and the operating lever 28 can be formed as an integral piece either cast or of welded construction. A double-acting fluid pressure cylinder 29 (hydraulic or pneumatic) is supported on trunnions 30 located beyond the free end of the operating lever 28. Said cylinder contains a reciprocable piston and piston rod 31, the end of which is pivoted to the free end of the operating lever 28.

An article delivery carrier 32 is fixed to the shaft 21 to turn therewith (Figures 2 and 4). The latter carrier includes a hub 33 keyed to the shaft 21, a platform 34 fixed to said hub and a plurality of reinforcing gussets 35. In the example of handling metal coils, the platform preferably carries a pair of roller tables 36 arranged to form a shallow V in end elevation (Figure 2). Preferably the platform also carries an L-shaped load support and pusher 37 and a double-acting fluid pressure cylinder 38 for operating said pusher. The pusher 37 and cylinder 38 are located between the two roller tables 36. One arm 37a of the pusher extends approximately at right angles to the platform adjacent the hub 33 (Figure 3). Shaft 21 extends outwardly beyond the outer supporting frame 15, and an operating lever 39 is keyed to the extended portion thereof (Figures 2 and 4). A double-acting fluid pressure cylinder 40 is supported on trunnions 41, approximately aligned with the trunnions 30. Said cylinder contains a reciprocable piston and piston rod 42, the end of which is pivoted to the free end of the operating lever 39.

The center line between the two roller tables 36 is laterally aligned with the center line of the conveyor 12 and the fingers 25, 26 and 27 (Figures 1 and 2). The article delivery carrier has an upright position shown in solid lines in Figure 3 in which its roller tables 36 are approximately perpendicular to the conveyor 10 and the perpendicular arm 37a of its pusher is approximately in the plane of this conveyor. This carrier also has an approximately horizontal position shown in dot-dash lines in Figure 3 in which its roller tables form a continuation of the conveyor 12. Preferably a beam 43 extends between the frames 15 and 16 to act as a stop for the carrier in its horizontal position. Preferably also a short length roller table 44 is interposed between the carrier and the conveyor to furnish a smooth juncture.

In operation, at the start the carrier 22 is in its load receiving position, in which its arm portion 24a is horizontal, and the carrier 32 is in its upright position. After conveyor 10 transports an article A to a position over the fingers 25, 26 and 27, the cylinder 29 is operated to raise the carrier 22 and thus lift the article. The cylinder 40 also is operated to move the carrier 32 back with the carrier 22 and thus maintain the perpendicular relation of the carriers. Preferably the cylinders are operated by separate positive displacement hydraulic pumps which assure that they move together at this stage. After the carriers turn approximately 45° to 60°, the weight of the article is transferred to the carrier 32, where it is sustained by the roller tables 36 and the pusher arm 37a. The carrier 22 now can be returned to its starting position by operation of the cylinder 29 in the opposite direction. During the return movement of the carrier 22 the effective area of the piston is reduced by the cross sectional area of the piston rod 31; consequently the return movement is at a faster speed than the lifting movement. The other carrier 32 continues to turn until it reaches its approximately horizontal position, whereupon the cylinder 38 is operated to advance the pusher 37 and push the article to the roller table 44 and thence to the conveyor 12. Thereafter the cylinders 40 and 38 are operated to return the carrier 32 and the pusher 37 to their original positions.

It is seen that the device is ready to receive the next article A as soon as carrier 22 returns to its original position. This carrier can be returned after it rotates only about 45° to 60°. There is no need to wait for the carrier 32 to complete its operating cycle, that is, to rotate to its article delivery position and back, as where these carriers are rigidly connected. Thus the speed at which articles can be transported to the transfer device is materially increased. In the example of strip metal coils, I find that articles can be transported approximately at the rate of one every half minute to the transfer device. It is also seen that the transfer device lends itself readily to automatic operation. The only additional items needed are electrically operated valves for controlling the cylinders 29, 38 and 40 and an appropriate system of limit switches controlled by the carriers for operating these valves.

While I have shown and described only a single embodiment of the invention, it is apparent that modifications may arise. Therefore I do not wish to be limited to the disclosure set forth but only by the scope of the appended claims.

I claim:

1. The combination with a first conveyor and a second conveyor disposed at right angles to each other, said second conveyor having an entry end spaced horizontally from the side edge of said first conveyor, of a device for transferring articles from the first conveyor to the second conveyor and downtilting them through an arc of approximately 90° so that they rest on a face which is approximately perpendicular to the face on which they previously rested comprising a support situated in the space between said conveyors, an article receiving carrier and an article delivery carrier mounted on said support for independent rotation on a common horizontal axis, said receiving carrier including a plurality of depending fingers and having a substantially horizontal position in which said fingers interfit with the elements of said first conveyor for receiving an article therefrom, said delivery carrier being laterally aligned with said receiving carrier and having an upright position approximately perpendicular to said receiving carriers, operating means connected with said receiving carrier for rotating it upwardly through an arc of approximately 45° to 60° and immediately thereafter returning it to its horizontal position, and independent operating means connected with said delivery carrier for rotating it downwardly from its upright position, said receiving carrier being adapted to tilt the article through an arc of approximately 45° to 60°, said delivery carrier being adapted to take the tilted article from said receiving carrier, and alone downtilt it the remainder of the 90° arc and deliver it to said second conveyor, said receiving carrier being adapted to receive another article immediately after returning to its horizontal position before said delivery carrier returns to its upright position.

2. A combination as defined in claim 1 in which said delivery carrier includes a platform, a pair of spaced apart roller tables mounted on said platform, and a pusher and operating means therefor mounted on said platform between said roller tables, said pusher being substantially L-shaped and having an arm extending perpendicularly to said platform adjacent the pivotal mounting of the carrier.

3. A combination as defined in claim 1 in which the operating means for each of said carriers includes an operating lever fixed relative to the carrier, a pair of trunnions, a double-acting fluid pressure cylinder pivotally supported in said trunnions and a reciprocable piston and piston rod mounted in said cylinder and pivoted to said operating lever.

References Cited in the file of this patent

UNITED STATES PATENTS

| | | |
|---|---|---|
| 2,278,140 | Sieger | Mar. 31, 1942 |
| 2,325,121 | Freeman | July 27, 1943 |
| 2,346,293 | Croy | Apr. 11, 1944 |
| 2,365,007 | Rideout et al. | Dec. 12, 1944 |
| 2,426,569 | Stewart | Aug. 26, 1947 |
| 2,567,819 | Matteson et al. | Sept. 11, 1951 |
| 2,586,006 | Conti | Feb. 19, 1952 |